March 25, 1952 — O. P. N. ZOPF — 2,590,359
PORTABLE COLLAPSIBLE CONVEYER
Filed Oct. 30, 1947 — 4 Sheets-Sheet 1
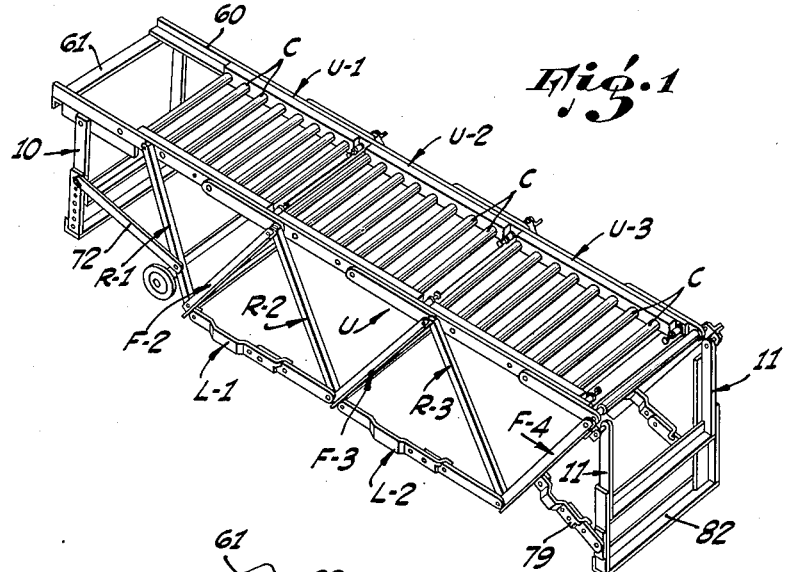
Fig. 1
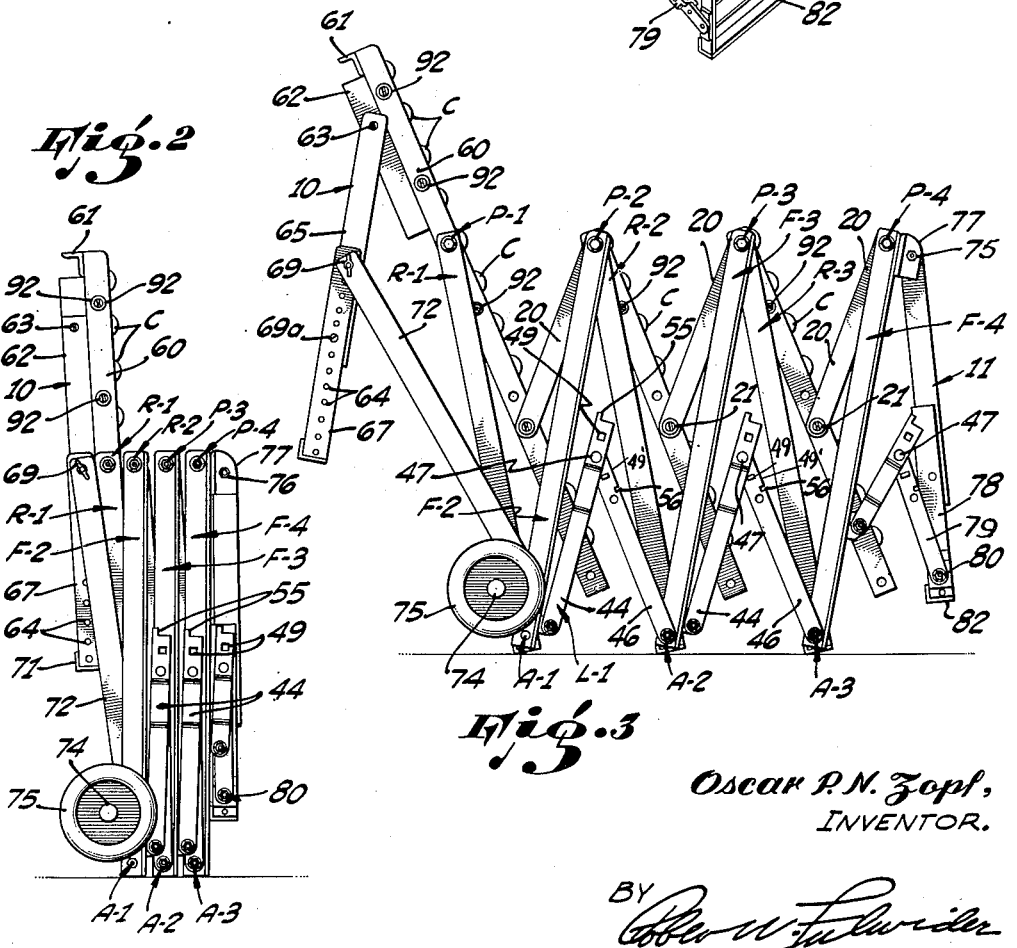
Fig. 2
Fig. 3
Oscar P. N. Zopf,
INVENTOR.
BY
ATTORNEY.

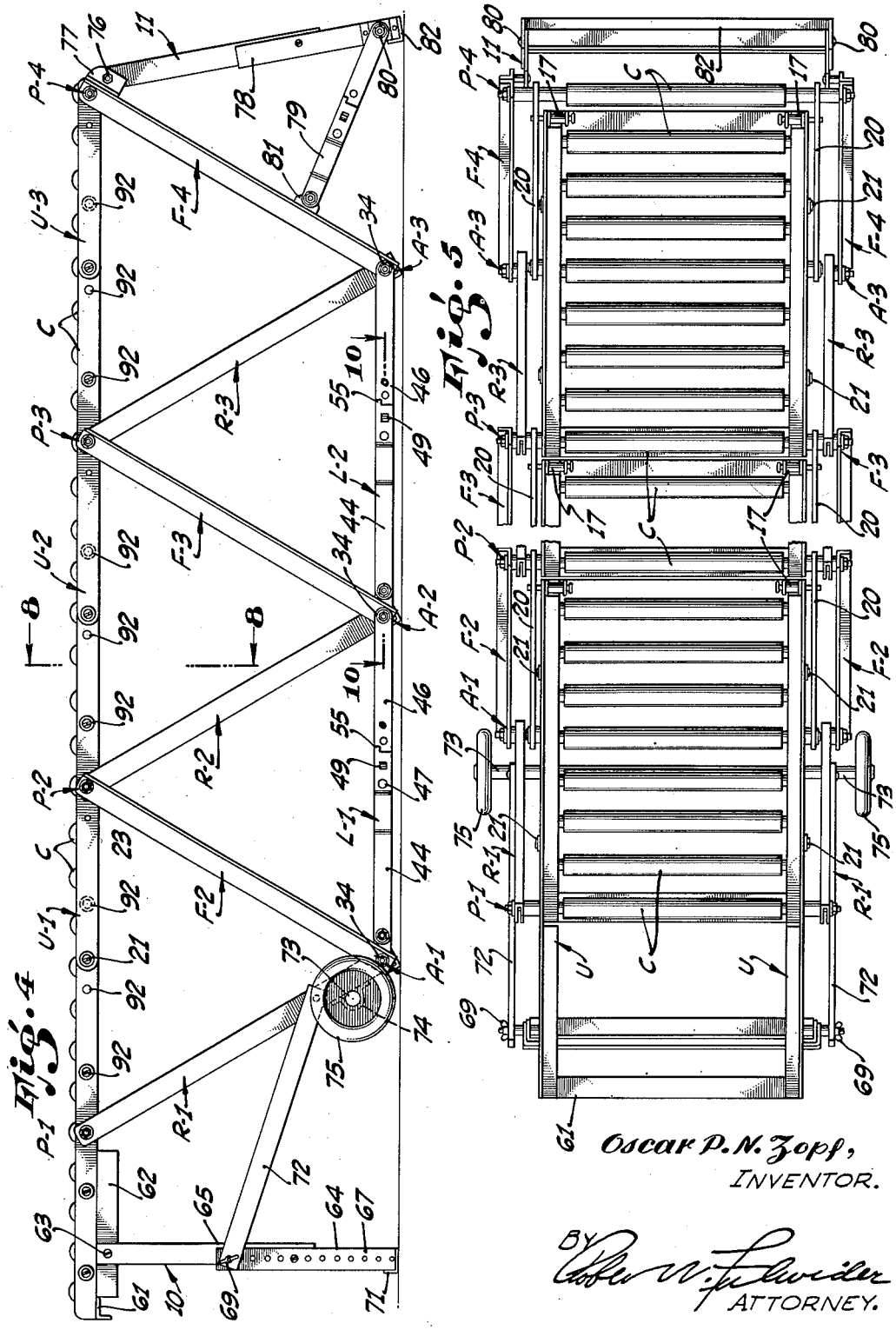

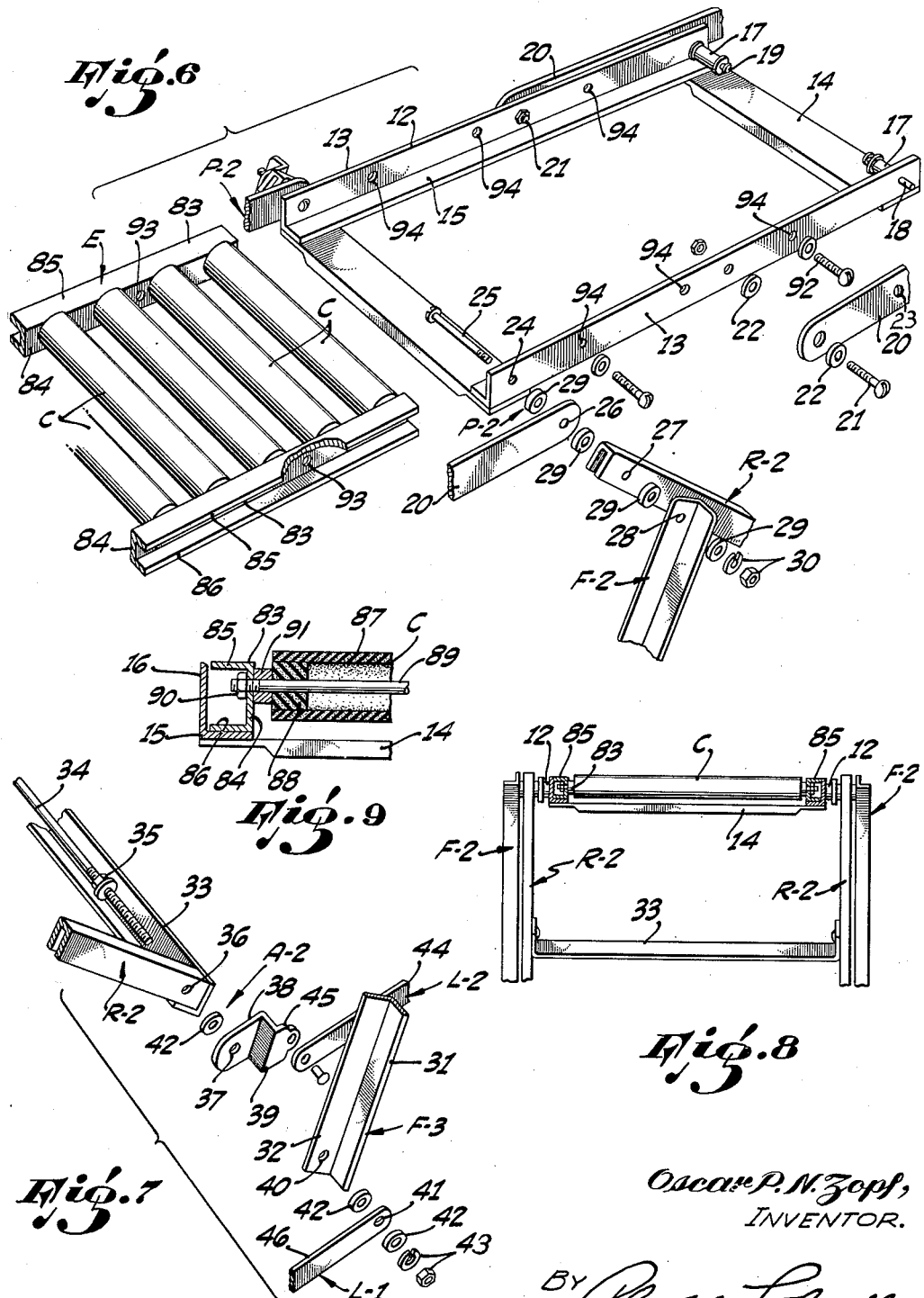

March 25, 1952 — O. P. N. ZOPF — 2,590,359
PORTABLE COLLAPSIBLE CONVEYER
Filed Oct. 30, 1947 — 4 Sheets-Sheet 4
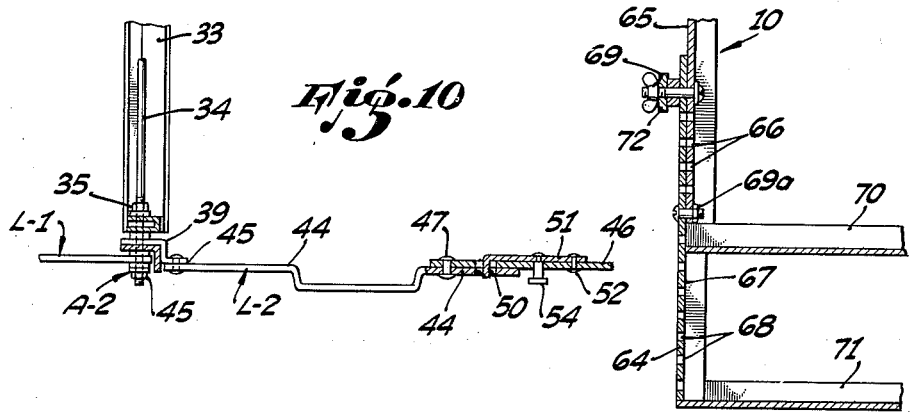
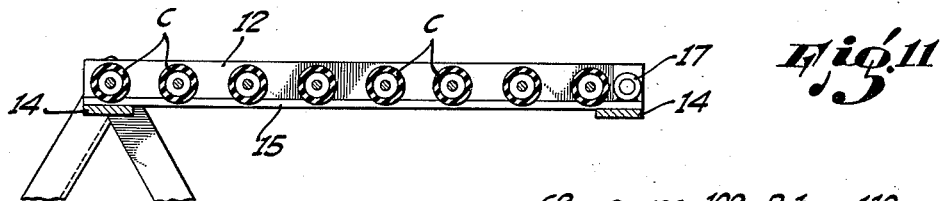
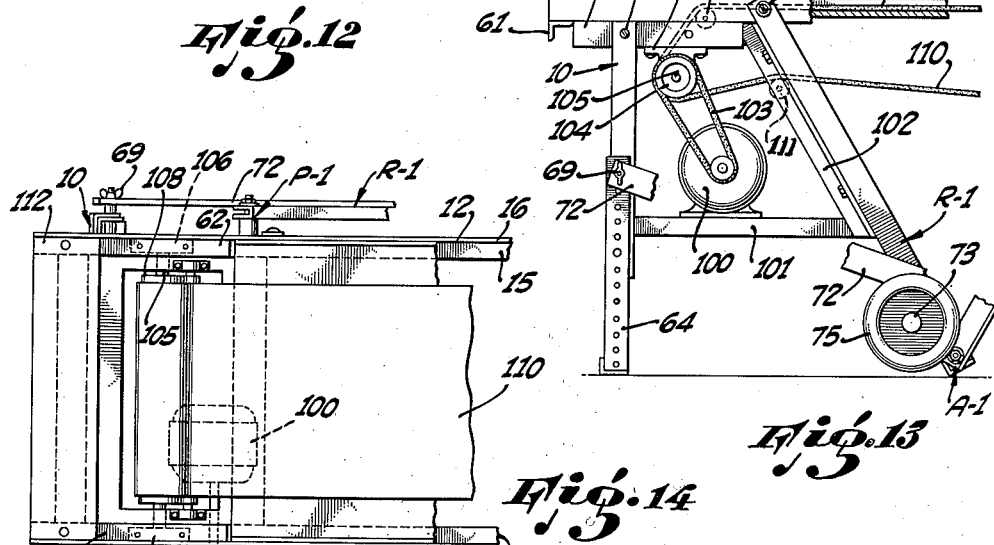
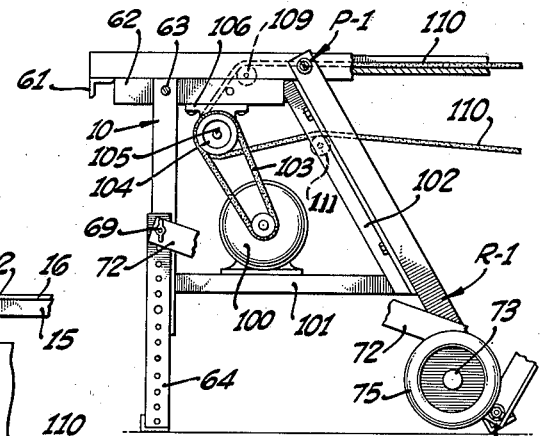
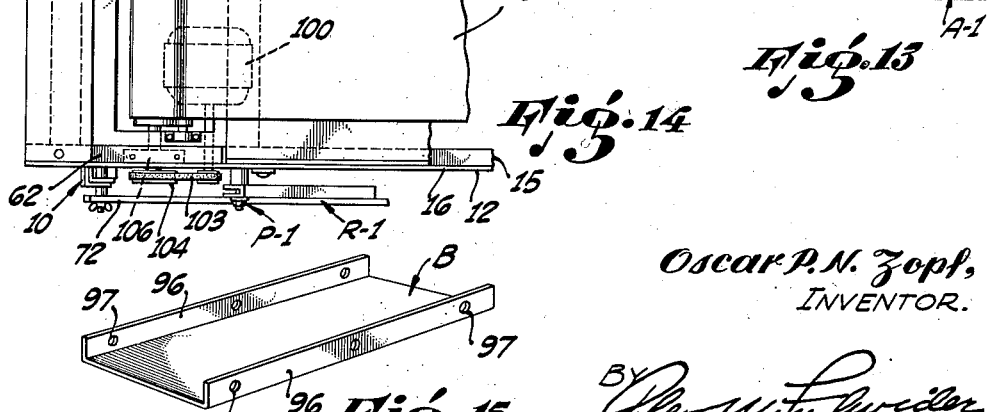
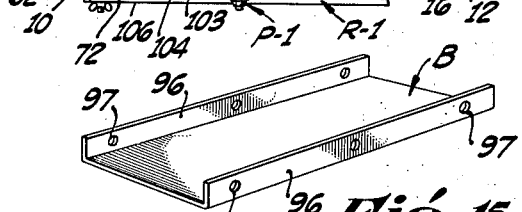
Oscar P. N. Zopf,
INVENTOR.
BY
ATTORNEY.

Patented Mar. 25, 1952

2,590,359

UNITED STATES PATENT OFFICE 2,590,359

PORTABLE COLLAPSIBLE CONVEYER

Oscar P. N. Zopf, Oxnard, Calif.

Application October 30, 1947, Serial No. 783,182

17 Claims. (Cl. 198—113)

My invention relates to the field of conveyors, and more particularly to a portable collapsible conveyor.

Although numerous conveyors have been devised and manufactured in the past a number of these devices have had the disadvantages that they were formed as substantially rigid structures which occupied valuable plant or factory space when not being utilized, were designed primarily for a very limited purpose and had little flexibility of use, could not be conveniently transported from place to place as the need for such equipment arose, and occupied valuable floor space during the time they were being moved to their destination.

It is to eliminate the disadvantages of the previously available conveyor equipment, as well as to provide a device that will accomplish the hereinafter mentioned objects and advantages that I have devised my present invention.

A major object of my invention is to provide a portable collapsible conveyor that will be light in weight, that can easily be moved or transported from one location to another, can be rapidly closed or opened to place the device in a folded or expanded position, will be simple to operate, and can be manufactured from inexpensive material with a relatively few mechanical operations which will permit it to be sold in the low and medium priced merchandising fields.

Another object of my invention is to furnish a conveyor that will have considerable flexibility of use in that it can be provided with either rollers or a solid bed, can be used as either a power driven or gravity operated device, that with the solid bed in place can be used as a sorting table, flumé, chute, slide, walkway, personnel conveyor, or gangplank, and which will be particularly useful to the armed services in unloading or loading supplies from ship to shore, as well as affording a convenient means of transporting supplies and personnel across rivers and streams.

A still further object of my invention is to supply a conveyor which can be expanded or contracted to the desired length by the insertion or removal of simple component parts, that can be manufactured from either ferrous or non-ferrous metals, can be used with either a belt, chain, drag chain or similar power driven equipment for the movement of material thereover, and is capable of being manufactured in small sizes for home use as well as larger sizes for commercial applications and the use of the armed services.

Yet another object of my invention is to provide a conveyor that can be formed as an integral part of a freight car, truck, bus, boat, ship or airplane, can be vertically adjusted at either end to permit the positioning of the conveyor bed for gravity operation, and can be used for various distances up to its maximum expanded length by simply expanding that portion of the device required to span the distance at hand.

These and other objects and advantages of my invention will become apparent from the following description of a preferred form thereof, and from the drawings illustrating that form in which:

Fig. 1 is a perspective view of my portable collapsible conveyor in the fully extended position;

Fig. 2 is a side elevational view of the device in the collapsed position;

Fig. 3 is a side elevational view of the device in the semi-collapsed position;

Fig. 4 is a side elevational view of the device in the expanded position ready for use;

Fig. 5 is a plan view of the device;

Fig. 6 is an exploded perspective view of a portion of the conveyor bed;

Fig. 7 is an exploded perspective view of a portion of a pair of the diagonal supporting members used in holding the conveyor bed in the extended position;

Fig. 8 is a vertical cross-sectional view of the device taken on the line 8—8 of Fig. 4;

Fig. 9 is a fragmentary vertical cross-sectional view of one of the rollers used in connection with my device;

Fig. 10 is a fragmentary horizontal cross-sectional view of one of the lower connecting members used in holding the conveyor in the extended position taken on the line 10—10 of Fig. 5;

Fig. 11 is a fragmentary vertical cross-sectional view of one of the vertically adjustable forward legs provided on the device;

Fig. 12 is a fragmentary vertical cross-sectional view of one of the horizontal roller supports;

Fig. 13 is a fragmentary side elevational view of the forward portion of the device showing the manner in which the conveyor can be power operated;

Fig. 14 is a fragmentary plan view of the forward portion of the device showing the power driven belt provided thereon; and Fig. 15 is a perspective view of one of the removable conveyor bed units.

Referring now to Fig. 1 for the general arrangement of my invention it will be seen that the supporting bed of the conveyor is formed from a pair of laterally spaced horizontal members U when the device is in the extended position which are adapted to support a series of units E having transversely disposed rollers C mounted therebetween. Should it be desired to move material other than by rolling over the conveyor each of the units E can be interchanged with a solid bed unit B as shown in Fig. 15. The members U except when the conveyor is in the extended position are not rigid structures, but are formed from a series of collapsible rectangular components U-1, U-2 and U-3. Pivotally mounted at points P-1, P-2, P-3 and P-4 on each of the components are two downwardly extending diagonal supporting members, those which extend forwardly being lettered F, and which extend rearwardly being lettered R. In addition, each diagonal member is provided with a numerical suffix that indicates the point P from which it originates. Each pair of diagonal members F and R when taken together form a vertical V-shaped panel that terminates on its downward end in an apex A which is also provided with a numerical suffix to designate its location on one of the lower connecting members L. Although but three components, U-1, U-2 and U-3, are shrown in the drawings, it will be apparent that the conveyor can be fabricated with as many as will be necessary to furnish the desired length when the conveyor is fully expanded.

In Figs. 2 and 3 the conveyor is shown in folded and semi-folded positions respectively, in which it will be seen that the members U and L are each provided with a breaking joint that permits the conveyor to be collapsed into a compact unit when it is not being used.

It will be noted in Figs. 1 and 4 that with the exception of a pair of forward supporting legs 10, and a pair of rearward supporting legs 11, that the conveyor is supported by V-shaped panels that are identical with one another. A typical vertical panel will be described, which is of course the same on both sides of the conveyor, and is that formed between the points P-2, P-3 and apex A-2.

The supporting bed section of the conveyor situated between the pivot points P-2 and P-3 as best seen in Fig. 6 is fabricated as a rectangular frame 12 having longitudinally extending, laterally spaced, side members 13 which are rigidly joined to one another on the underside of each end thereof by a cross piece 14. Each of the side members 13 has an L-shaped cross-section, with one of its flanges 15 being disposed in a horizontal inwardly extending position, while the opposite flange 16 projects vertically upward. A horizontally positioned lock 17 of conventional design, having a spring loaded plunger 18 together with a handle 19 for operating same, is located on the interior rearward portion of each of the side members 13. The plunger 18 when in the normal operating position projects outwardly through a suitable opening formed in the flange 16 as shown in Fig. 6.

To maintain each of the supporting frames 12 in a substantially horizontal plane during the time the conveyor is in the extended position, a narrow rectangular member 20 is rotatably mounted on each of the pivot points P-2, P-3 and P-4. Each of the members 20 terminates at a point substantially close to the mid-point of one of the members 13, and is pivotally joined thereto by a bolt 21 that engages suitable openings provided in both members. A spacing washer 22 is preferably placed on each side of the member 20 to reduce friction as this member moves with relation to the side member 13. The locking of the frame 12 and the members 20 in a substantially horizontal position is accomplished by providing each of the latter members with an opening 23 which is adapted to be engaged by the plunger 18 when the frame is in an extended position. Obviously when the plungers 18 are withdrawn from the openings 23 there will be no horizontal support for the frames 12, and the conveyor can be collapsed as shown in Figs. 2 and 3.

In Fig. 6 it will be seen that the pivot point P-2 which is typical of the other points P, is formed by providing an opening 24 in the flange 16 through which projects the outer end of a bolt 25. This portion of the bolt 25 engages an opening 26 situated in the rearward portion of the member 20, an opening 27 located in the upper part of the supporting member R-2, and an opening 28 formed near the top of the member F-2. The members 20, R-2 and F-2 mounted on the bolt 25 are preferably separated from one another by a spacing washer 29 to reduce rotational friction, and are held together as an integral unit by a locking washer and nut 30 that engage the outer end of the bolt.

Although the members R-2 and F-2 occupy similar positions in supporting the conveyor bed at the pivot points P-2, each of these members is structurally different from the other. In Fig. 7 at apex A-2 it will be noted that the member F-3, which is identical to member F-2, is formed from material of an L-shaped cross-section having an outwardly extending flange 31, and a flange 32 that is disposed parallel to the conveyor bed flange 16. The supporting member R-2, however, is fabricated from material having a narrow, inverted, channel shaped cross-section. As a further difference the members R-2 are connected to one another at the apexes A-2 by a cross-piece 33 of L-shaped cross-section, whereas the members F-2 have no such connecting member. A rod 34 threaded on each end is situated between the flanges of the cross-piece 33, and extends outwardly therefrom to engage an opening 36 provided in the lower part of the supporting member R-2, an opening 37 formed in an arm 38 of an offset connecting link 39, an opening 40 situated in the lower portion of the supporting member F-3, and an opening 41 located in the rearward portion of a lower connecting member L-1. Each of the members R-2, 39, F-3 and L-1 is preferably separated from its adjoining member on the rod 34 by a spacing washer 42 as shown in Fig. 7, with the assembly at each of the apexes A-2 being held together as an integral unit between an inwardly disposed adjustable nut 35 and an outer locking washer and nut 43.

The member L-2 which is typical of the connecting members used between the apexes A in holding the conveyor in an extended position can best be seen in Fig. 10. Each of the two members L-2 is formed from two component parts; a forward rigid strip 44 that is pivotally connected to the apex A-1 by being riveted to an arm 45 on the connecting link 39, and a rearwardly disposed strip 46 that directly engages the rod 34 which passes through the apexes A-2. It will be noted that the forward portion of the strip 46 overlaps the rearward portion of the strip 44, and is pivotally connected thereto by a rivet 47 that engages suitable openings provided in both strips.

Situated directly behind the rivet 47 and formed in each of the strips 44 and 46 are square openings 49 and 49′ respectively, as may best be seen in Fig. 3. The openings 49 and 49′ are adapted to be aligned with one another, and when engaged by a pin 50 in this position hold the units U in a material conveying plane. The pin 50 is preferably formed by bending the outer end of a longitudinally extending resilient member 51 at an angle of ninety degrees thereto, with the opposite end of the member 51 being affixed to the inner surface of the strip 46 by a rivet 52. An actuating member 54 is slidably mounted on the strip 46 normal thereto, and is adapted to engage the outer face of the member 51 whereby the pin 50 can be caused to either engage or become disengaged from the openings 49. In Figs. 3 and 4 it will be seen that by the use of a short inwardly extending arm 55 formed on the rearward end of the member 44, which engages a slot provided in the member 46, the members 44 and 46 are prevented from moving downwardly further than a position in which they are parallel to the conveyor bed units U.

Thus by the use of the pin 50 the section L-1 can be held in a rigid horizontal position during the time it is desired to maintain the conveyor in an extended position, or when it is desired to collapse the conveyor the pin can be removed from the openings 49 to prmit the section L-1 to pivot upwardly on the rivet 47.

Referring now to Fig. 4 it will be seen that each of the side members 13 in component U-1 project forwardly beyond the pivot points P-1 into an extension 60, on the outer end of which is mounted a cross-piece 61. The cross-piece 61 acts not only as a handle when the conveyor is being folded into a compact unit as shown in Figs. 2 and 3, but as a reinforcing member between the extensions 60. A length of metallic material having an L-shaped cross-section extends longitudinally along the lower face of each of the extensions 60, with one of its flanges being bolted or welded thereto, and its opposite flange 62 extending vertically downward. Pivotally supported by a screw 63 from the forward portion of each of the flanges 62 is one of the supporting legs 10 which is furnished on its lower portion with a verticaly adjustable member 64 as can best be seen in Figs. 4 and 11. Each of the legs 10 is preferably formed from rigid material with an L-shaped cross-section, and having one of its flanges 65 parallel with the side members 13. The flanges 65 are each provided with a series of vertically spaced openings 66 therein. The members 64 are also fabricated from material having an L-shaped cross-section, and are each provided with a flange 67 that has a number of vertically spaced openings 68 formed therein which are adapted to be aligned with the openings 66. Thus by the use of a thumb screw assembly 69 of conventional design, and a screw 69a that engages the openings 66 and 68 the legs 10 and members 64 can be placed at a height to hold the bed of the conveyor in the desired plane. For reinforcing purposes the lower ends of the legs 10 are connected to one another by a cross-piece 70, as are the adjustable members 64 by a cross bar 71.

When the conveyor is in the fully extended position the supporting legs 10 are maintained in a substantially vertical position by two longitudinally extending cross braces 72, each of which is pivotally mounted on one end on the thumb screw 69, and on the opposite end on a screw or pin that is affixed to the lower portion of the member R-1. Should it be found inconvenient to connect each of the cross braces 72 to the member R-1 it can be rotatably mounted on a transverse shaft 73 that extends between a pair of journals 74 of conventional design, each of which is mounted on the lower forward portion of one of the diagonal members R-1. A pair of rubber tired wheels 75, each rotatably mounted on an outer end of the shaft 73, permits the conveyor to be moved from place to place when it is collapsed into the position shown in Fig. 2.

Each of the rearward supporting legs 11 is pivotally mounted on a screw 75 that engages an L-shaped bracket 77 which is affixed to the upper rearward side of the member F-4. The legs 11 in construction are similar to the legs 10, and are likewise supplied on their lower ends with vertically adjustable members 78. Each of the legs 11 is provided with a cross brace 79 that extends forwardly from a screw 80 situated on the lower portion of the leg to an L-shaped bracket 81 that is mounted on the rearward face of the member F-4. The cross brace 79 although shorter in length is identical in construction with the connecting members L-1 and L-2, and is rotatably connected to the bracket 81. A cross-piece 82, preferably of L-shaped cross section connects the lower end of each of the adjustable members 78.

In Figs. 5, 6, 8 and 9 it will be seen that each of the units E which rotatably support the rollers C is formed from a pair of laterally spaced side members 83, each of which has a channel shaped cross section. Each of the members 83 is disposed with its web 84 vertically positioned, and an upper and lower flange 85 and 86 respectively, extending outwardly therefrom. The rollers C are each preferably formed from a hollow tubular shell 87 of a phenolic resin that is provided on each end with an internally disposed cylindrical member 88 through which a supporting shaft 89 passes. It will be obvious that the rollers C are not limited to this type of construction, but that any conventional roller can be used with the conveyor. Each end of the shaft 89 is threaded, and is supported in one of a series of equally spaced openings that extend longitudinally along the length of each of the side members 83. The shaft 89 not only serves to support the roller C, but holds the roller supporting unit E together as an integral unit by nuts 90 which are threaded on the ends of each of the shafts. To reduce rotational friction between the ends of the roller C and the interior faces of the side members 83 a spacing washer 91 is inserted therebetween as shown in Fig. 9.

It will be noted that the openings used in supporting the shafts 89 are not centrally disposed on the webs 84, but are located somewhat above the horizontal centerline thereof in order that the upper limits of the rollers C will be above the upper limits of the flanges 85. In this manner bulk material having a width greater than that existing between the side members 83 can be moved on the conveyor without danger of the material binding between the webs 84. Should the goods being moved over the conveyor be rather small in size, the flanges 85 can be used to support the units E on the side members 13 which will result in the upper limits of the rollers C being below the exterior face of the upper horizontal flanges 85. Thus the webs 84 will serve as guiding members for small articles moving over the rollers C.

The roller supporting units E are each adapted to be slidably mounted between the conveyor side members 13, and are held in place therein by screws 92 that engage openings 93 provided in the webs 84 and similar openings 94 formed in the side member flanges 16 as shown in Fig. 6. It will be noted in Fig. 5 that the openings 93 and 94 are so arranged that when the roller supporting units E are fully positioned the rearward end of one unit and the forward end of the adjoining unit almost contact the locks 17 situated therebetween.

Shown in Fig. 15 is a solid rectangular bed unit B that is preferably fabricated from sheet aluminum, and is adapted to be slidably inserted into one of the frames 12. The longitudinal sides of the bed unit B are provided with upwardly extending flanges 96 that have openings 97 formed therein which are adapted to be aligned with the openings 94, and serve to hold the unit in place in the frame 12 when engaged by the screws 92. Thus each of the bed units B can be used to form a conveyor surface over which material can flow, slide, roll and otherwise be moved. In addition, in the larger sizes of the conveyor the units B form a surface over which personnel, animals and power vehicles can be moved. A continuous surface is afforded by the bed units B when in place in the conveyor as the joints therebetween are made over the cross pieces 14 which prevent any spillage or leakage of material.

Upon occasion it may be found desirable to rotate the rollers C by power in order that material can be moved over the conveyor when the bed thereof is in a substantially horizontal position.

A power driven belt which can be added to any one of my conveyors whether it is equipped with rollers C or solid bed units B is shown in Fig. 13. An electric motor 100 of conventional design is added to the conveyor by being mounted on a pair of laterally spaced substantially horizontal members 101 of L-shaped cross section. Each of the members 101 is supported in a conventional manner from a member 102 of L-shaped cross section that extends longitudinally along the forward face of one of the supporting members R-1. A belt 103 serves to connect the motor 100 to a pulley 104 which is affixed to one end of a horizontally disposed shaft 105. The shaft 105 is rotatably supported between two journals 106 of conventional design, each of which is affixed to one of the flanges 62. A roller 108 of slightly less width than the rollers C is rigidly affixed to the shaft 105 between the journals 106. An idling roller 109 is rotatably mounted above the roller 108, and serves to support one end of a belt 110 that is driven by the latter roller. The belt 110 continues over the rollers C the entire length of the conveyor, and is held in a substantially taut condition by a vertically adjustable idling roller 111 that is supported between the members 102. It will be apparent that should it be desired, the rollers C can be replaced with solid bed units B over which the belt 110 can move. Thus, with the motor 100 rotating, the roller 108 is driven, as is the belt 110, and goods can be moved on the conveyor when the bed thereof is in a horizontal plane. For convenience I have found it desirable to place a package rest 112 at the extreme forward end of the conveyor as shown in Fig. 14 which is made from a rectangular plate of metallic material supported between the extensions 60.

The operation of my invention as can be seen in Figs. 1, 2 and 3 is extremely simple. I have found from experience that conveyors having a bed section 30 inches in length can be made in which the ratio of the length of the device in the extended position as shown in Fig. 1 to that in the collapsed condition shown in Fig. 3 is sixteen to one. Of course, this ratio will vary with the size of the conveyor as well as the material from which it is fabricated.

In using the conveyor it is moved on the wheels 75 to the desired location, and then placed in the extended position by holding the forward end stationary and moving the rearward end horizontally until this condition has been attained. It is particularly important to realize that should the distance over which the material is to be transported be shorter than the length of the conveyor in its fully extended position that only the rearward portion of the conveyor necessary to span the distance at hand will be placed in the extended horizontal position. As the conveyor is unfolded from the collapsed state the members 20 and the frames 12 forming the conveyor bed components move upwardly into a horizontal position where they can be fastened into place by the use of the locks 17. At the same time the strips 44 and 46 forming the connecting members L-1 and L-2 are straightening out to form a continuous lower connecting member L. By the use of the pins 50 each of the connecting members L-1 and L-2 can be held in a rigid horizontal position. The cross braces 72 and 79 also move downwardly during the above described action to hold the forward and rearward legs 10 and 11 respectively, in a rigid vertical position. By varying the height of the legs 10 and 11 as previously explained the bed of the conveyor can be placed in the desired slope for gravity operation.

While the particular device herein shown and described in detail is fully capable of attaining the objects and providing the advantages hereinbefore stated it is to be understood that it is merely illustrative of the presently preferred form of my invention, and that I do not mean to limit myself to the details of construction or design herein shown other than as defined in the appended claims.

I claim:

1. A collapsible conveyor which includes: a plurality of rectangular conveyor components; a rigid member pivotally mounted on the longitudinal side of each of said components; a downwardly extending supporting member pivotally mounted on the longitudinal side of each of said components; a second downwardly extending supporting member pivotally connected to each of said rigid members; a pin pivotally connecting said first and said second supporting members; a plurality of longitudinally extending connecting members, with the ends of each end of said members being pivotally mounted on one of said pins, and being each formed of two pieces pivotally connected together to provide a breaking joint, whereby said connecting member can fold upwardly; means for holding each of said connecting members in an extended position; a plurality of conveying units, with each of said units being adapted to be removably supported in one of said conveyor components; and locking means for holding each of said conveyor components and said pair of rigid members attached thereto in an extended position when each of said connecting members is in a similar extended position whereby material can be moved over said conveying units.

2. A collapsible conveyor which includes: a plurality of rectangular conveyor components;

a rigid member pivotally mounted on the longitudinal side of each of said components; a downwardly extending supporting member pivotally mounted on the longitudinal side of each of said components; a second downwardly extending supporting member pivotally connected to each of said rigid members; means pivotally connecting said first and second supporting members; a plurality of longitudinally extending connecting members pivotally mounted on said pivotal means, and being each formed of two pieces pivotally connected together to provide a breaking joint whereby said members can be folded upwardly; means for holding each of said connecting members in an extended position; a plurality of conveying units adapted to be removably supported on said conveyor components; and locking means for holding each of said components and said pair of rigid members attached thereto in an extended position when each of said connecting members is in a similar extended position whereby various bodies can be moved over said conveying units.

3. A collapsible conveyor which includes: a plurality of rectangular conveyor components; a rigid member pivotally mounted on the longitudinal side of each of said components; a downwardly extending supporting member pivotally mounted on the longitudinal side of each of said components; a second downwardly extending supporting member pivotally connected to each of said rigid members; a plurality of pins, each of said pins pivotally connecting one of said first and said second supporting members; a plurality of longitudinally extending connecting members, with the ends of each of said members being pivotally mounted on one of said pins, and being each formed of two pieces pivotally connected together to provide a breaking joint whereby said members can fold upwardly; means for holding each of said connecting members in an extended position; a pair of legs pivotally supported from the forward end of said conveyor components; a second pair of legs pivotally supported from the rearward end of said conveyor components; means for locking said first and second pairs of legs in a supporting position when said conveyor components are in an extended position; a plurality of roller supporting units, with each of said units being adapted to be supported in one of said conveyor components; and locking means for holding each of said components and said pair of rigid members attached thereto in an extended position when each of said connecting members is in a similar extended position whereby material can be moved over said roller supporting units.

4. A collapsible conveyor which includes: a plurality of rectangular conveyor components; a rigid member pivotally connected on the longitudinal side of each of said components; a downwardly extending supporting member pivotally mounted on the longitudinal side of each of said components; a second downwardly extending supporting member pivotally connected to each of said rigid members; a pin pivotally connecting said first and said second supporting members; a plurality of longitudinally extending connecting members, with the ends of each of said members being pivotally mounted on one of said pins, and being each formed of two pieces pivotally connected together to provide a breaking joint provided on each of said connecting members whereby said member can fold upwardly; means for holding each of said connecting members in an extended position; a pair of legs pivotally supported forward of said conveyor components; a second pair of legs pivotally supported rearward of said conveyor components; means for locking said first and second pairs of legs in a substantially vertical position when said conveyor components are in an extended position; a plurality of solid bed units, with each adapted to be supported in one of said conveyor components; and locking means for holding each of said conveyor components and said pair of rigid members attached thereto in an extended position when each of said connecting members is in a similar extended position whereby inanimate or animate bodies can be moved over said bed units.

5. A collapsible conveyor which includes: a plurality of rectangular conveyor components; a rigid member pivotally mounted on the longitudinal side of each of said components; a downwardly extending supporting member pivotally mounted on the longitudinal side of each of said components; a second downwardly extending supporting member pivotally connected to each of said rigid members; a plurality of pins, with each of said pins pivotally connecting one of said first and second supporting members; a plurality of longitudinally extending connecting members, with the ends of each of said members being pivotally mounted on one of said pins, and being each formed of two pieces pivotally connected together to provide a breaking joint whereby said members can fold upwardly; means for holding each of said connecting members in an extended position; a pair of legs pivotally supported from one of said conveyor components; a second pair of legs supported from another of said conveyor sections; means for locking said first and second pairs of legs in a substantially vertical position when said conveyor components are in an extended position; a plurality of roller units, with each of said units being adapted to be supported in one of said conveyor components; a rotatably mounted belt extending the longitudinal length of said conveyor, and adapted to contact the upper surface of the rollers of said roller units when said conveyor is in an extended position; power means for moving said belt; and means for holding each of said conveyor components and said pairs of rigid members attached thereto in an extended position when each of said connecting members is in a similar extended position whereby material can be moved on said belt, and upon the movement of said material being completed said conveyor may be collapsed into a compact unit.

6. A collapsible conveyor which includes: a plurality of rectangular conveyor components; a rigid member pivotally mounted on each longitudinal side of each of said components; a downwardly extending supporting member pivotally mounted on each longitudinal side of each of said components; a second downwardly extending supporting member pivotally connected to each of said rigid members; a plurality of pins, with each of said pins pivotally connecting one of said first and second supporting members; a plurality of longitudinally extending connecting members, with the ends of each of said members being pivotally mounted on one of said pins, and being each formed of two pieces pivotally connected together to provide a breaking joint whereby said members can fold upwardly; means for holding each of said connecting members in an extended position; a pair of legs pivotally supported from one of said conveyor components; a second pairs of legs supported from another of said conveyor components; means for locking said first and second pairs of legs in a substantially vertical position when said conveyor components are in an extended position; a movably mounted belt extending the longitudinal length of said conveyor, and adapted to move over said components when said conveyor is in an extended position; power means for rotating said belt; and locking means for holding each of said conveyor components in an extended position when each of said connecting members is in a similar extended position whereby material can be moved on said belt, and upon the movement of said material being completed said conveyor may be collapsed into a compact unit.

7. A collapsible conveyor which includes: a conveyor component capable of receiving and holding a conveying unit; a pair of rigid members pivotally mounted on said component with each of said members being provided with an opening; a pair of supporting members pivotally mounted on said component; a second pair of supporting members pivotally connected to said rigid members; a rigid member connecting the lower ends of said first pair of supporting members; means pivotally connecting the lower ends of said first and second pair of supporting members; and a pair of locks, with each of said locks mounted on one of the longitudinal sides of said conveyor component and adapted to engage one of said openings whereby said conveyor component will be held in a substantially horizontal position but upon said locks being disengaged from said openings said conveyor component and supports can be placed in a substantially vertical position to occupy a minimum of floor space when said conveyor is not in use, and means to removably affix said conveying unit to said conveyor unit.

8. A collapsible conveyor which includes: a plurality of conveyor components with each of said components capable of receiving and holding a conveying unit; a plurality of pairs of rigid members, with each of said pair of rigid members pivotally mounted on one of said components; a plurality of pairs of supporting members, with each of said pair of members being pivotally mounted on one of said components; a plurality of pairs of second supporting members, with each of said pairs of members being pivotally mounted on one of said pair of rigid members; a plurality of rods, with each of said rods pivotally connecting the lower ends of one of said first and second pairs of supporting members; a plurality of pairs of locks, with each of said pair of locks mounted on one of said components and adapted to engage openings provided in said components; a plurality of pairs of connecting members, with each of said pair of connecting members adapted to break upwardly at the center thereof, and movably connecting said rods; and means for locking each of said pair of connecting members in a substantially horizontal position when said conveyor components are held in a substantially horizontal position by said locks engaging said openings, and adapted to permit said connecting members to break upwardly when said locks are placed in a disengaging position to permit said components and supporting members to move into a substantially vertical position whereby they will occupy a minimum of floor space when said conveyor is not in use, and means to removably affix each of said units to one of said components.

9. An end support for a collapsible portable conveyor formed of a plurality of conveyor components which includes: a pair of legs pivotally supported from a conveyor component, with each of said legs being provided with a plurality of vertically spaced openings; a pair of rigid members, with each of said members provided with a plurality of vertically spaced openings adapted to be aligned with said openings provided in said legs; means for engaging said openings provided in said legs and members to maintain said legs and members at the desired overall height; a pair of cross braces, with each of said braces movably supported between one of said legs and a support of the conveyor and each formed of two parts pivoted together to provide a breaking joint; and locking means adapted when in the locked position to hold said cross braces in a rigid position when said legs are in a substantially vertical position, but when in the unlocked position adapted to permit said cross braces to break upwardly whereby said conveyor section, legs and cross braces are placed in a substantially vertical position to occupy a minimum of floor space when said conveyor is not in use.

10. A collapsible conveyor that includes: a plurality of conveying units; a plurality of conveyor components, with each of said components supporting one of said units; a plurality of pairs of rigid members, with each of said pairs being pivotally mounted on one of said components; a plurality of pairs of supporting members pivotally connected to each of said components; means for locking each of said components in a substantially horizontal position and said supporting members in a supporting position; and means to removably affix each of said conveying units to one of said conveyor components.

11. A collapsible conveyor that includes: a plurality of conveying units; a plurality of conveyor components, with each of said components supporting one of said units; a plurality of pairs of rigid members, with each of said pair of rigid members being movably connected to one of said components; a plurality of pairs of supporting members, with said pairs being pivotally connected to said components and rigid members to support said components in a substantially horizontal position; means for locking said conveyor components and rigid members in a substantially horizontal position; and means to removably affix each of said conveying units to one of said conveyor components.

12. A collapsible conveyor that includes: a plurality of conveying units; a plurality of interconnected conveyor components, with each of said components being capable of supporting one of said units; a plurality of conveyor component supports, with each of said supports forming a V-shaped panel when said conveyor component which it supports is in an extended position; means to hold each of said components in an extended position; and means to affix each of said units to one of said components.

13. An end support for a collapsible conveyor formed of a plurality of conveyor components which includes: a vertically adjustable leg supported from a conveyor component; supporting means for said conveyor; a cross brace, with said brace movably supported between said leg and a supporting means of said conveyor and formed of two pieces pivotally connected together to provide a breaking joint; and locking means when in the locked position holding said cross brace in a rigid position, but when in the unlocked position permitting said cross brace to move into a position whereby said conveyor section, leg and cross brace are placed in a substantially vertical position to occupy a minimum of floor space.

14. A collapsible conveyor that includes: a plurality of conveyor components; a rigid member pivotally mounted on the longitudinal side of each of said components; a plurality of supporting members pivotally connected to said components and said rigid members; a plurality of longitudinally extending connecting members movably affixed to said supporting members, each of the connecting members being formed of parts pivotally connected together to provide a breaking joint; means for holding each of said connecting members in an extended position; a plurality of conveying units, with each of said units being adapted to be removably supported in one of said conveyor components; and locking means for holding each of said components and said rigid members attached thereto in an extended position when each of said connecting members is in a similar extended position.

15. A collapsible conveyor that includes: a plurality of conveyor components; a plurality of rigid members movably mounted on the longitudinal sides of each of said components; a plurality of supporting members pivotally connected to said components and said rigid members; a plurality of longitudinally extending connecting members pivotally affixed to said supporting members, each of said connecting members being formed to provide a breaking joint; means for holding each of said connecting members in an extended position; a plurality of conveying units, with each of said units being adapted to be removably supported in one of said conveyor components; and locking means for holding each of said components and said rigid members attached thereto in an extended position when each of said connecting members is in a similar extended position.

16. A collapsible conveyor that includes: a plurality of conveyor sections; a plurality of rigid members movably mounted on the longitudinal sides of each of said sections; a plurality of supporting members pivotally connected to said sections and said rigid members; a plurality of longitudinally extending connecting members pivotally affixed to said supporting members; a breaking joint in each of said connecting members; means for holding each of said connecting members in an extended position; a plurality of conveying units, with each of said units being adapted to be removably supported in one of said conveyor sections; an endless belt extending over said conveyor sections; means for rotating said belt whereby material may be moved thereon; and locking means for holding said belt and said sections and said rigid members attached thereto in an extended position when said connecting members are in an extended position.

17. A collapsible conveyor which includes: a conveyor component capable of receiving and supporting a conveying unit; a pair of rigid members movably connected to said component; a pair of supporting members pivotally connected to said component and said rigid members; a second pair of supporting members pivotally connected to said component; means pivotally connecting the lower portions of said first and second pairs of supporting members; and a lock which when in the closed position is capable of maintaining said supporting members in a substantially horizontal conveyor component supporting position and in the open positions permits said component, rigid members, and supporting members to be collapsed into a substantially vertical position.

OSCAR P. N. ZOPF.

REFERENCES CITED

The following references are of record in the file of this patent:

UNITED STATES PATENTS

| Number | Name | Date |
| --- | --- | --- |
| 871,340 | Hrdina | Nov. 19, 1907 |
| 1,636,093 | Hartenstein | July 19, 1927 |
| 1,935,734 | Twomley | Nov. 21, 1933 |
| 2,066,383 | Andrada | Jan. 5, 1937 |

FOREIGN PATENTS

| Number | Country | Date |
| --- | --- | --- |
| 360,134 | Great Britain | Sept. 26, 1930 |
| 381,162 | Great Britain | Sept. 27, 1932 |
| 483,194 | Germany | Sept. 12, 1929 |